United States Patent
Tu et al.

(10) Patent No.: US 9,830,710 B2
(45) Date of Patent: Nov. 28, 2017

(54) SYSTEMS AND METHODS FOR HAIR SEGMENTATION

(71) Applicant: General Electric Company, Schenectady, NY (US)

(72) Inventors: Peter Henry Tu, Niskayuna, NY (US); Jixu Chen, Clifton Park, NY (US); Yang Yu, Secaucus, NJ (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/970,580

(22) Filed: Dec. 16, 2015

(65) Prior Publication Data

US 2017/0178336 A1   Jun. 22, 2017

(51) Int. Cl.
| | |
|---|---|
| *G06K 9/34* | (2006.01) |
| *G06T 7/00* | (2017.01) |
| *G06K 9/00* | (2006.01) |
| *G06K 9/62* | (2006.01) |
| *G06T 7/60* | (2017.01) |

(Continued)

(52) U.S. Cl.
CPC ........ *G06T 7/0085* (2013.01); *G06K 9/00268* (2013.01); *G06K 9/4604* (2013.01); *G06K 9/52* (2013.01); *G06K 9/6267* (2013.01); *G06T 7/60* (2013.01); *G06K 2009/4666* (2013.01); *G06T 2207/20144* (2013.01); *G06T 2207/30201* (2013.01)

(58) Field of Classification Search
CPC ..................... G06T 7/0085; G06T 7/60; G06T 2207/30201; G06T 2207/20144; G06K 9/00268; G06K 9/6267; G06K 9/4604; G06K 9/52; G06K 2009/4666

USPC .......................................................... 382/173
See application file for complete search history.

(56) References Cited

U.S. PATENT DOCUMENTS

| 8,638,993 B2 | 1/2014 | Lee et al. |
| 2003/0198384 A1 | 10/2003 | Vrhel |

(Continued)

FOREIGN PATENT DOCUMENTS

WO    2014177756 A1    11/2014

OTHER PUBLICATIONS

Yacoob et al., "Detection and analysis of hair", Pattern Analysis and Machine Intelligence, IEEE Transactions on, vol. 28, Issue 7, Jul. 2006, pp. 1164-1169.

(Continued)

*Primary Examiner* — Andrew Moyer
(74) *Attorney, Agent, or Firm* — John P. Darling

(57) ABSTRACT

A method includes receiving an image comprising a human head from an imaging device. Further, the method includes grouping one or more pixels of the image into one or more super pixels. Furthermore, the method includes generating a polar coordinate grid for the image, wherein the polar coordinate grid comprises one or more grid points. Additionally, the method includes labeling the one or more grid points as one of a face region, a hair region, and a background region based on tiered structure constraint. The method also includes labeling the one or more super pixels as one of the face region, the hair region, and the background region based on the one or more labels of the one or more grid points. Further, the method includes transmitting a notification comprising the one or more labels of the one or more super pixels.

19 Claims, 4 Drawing Sheets

Figure 1:
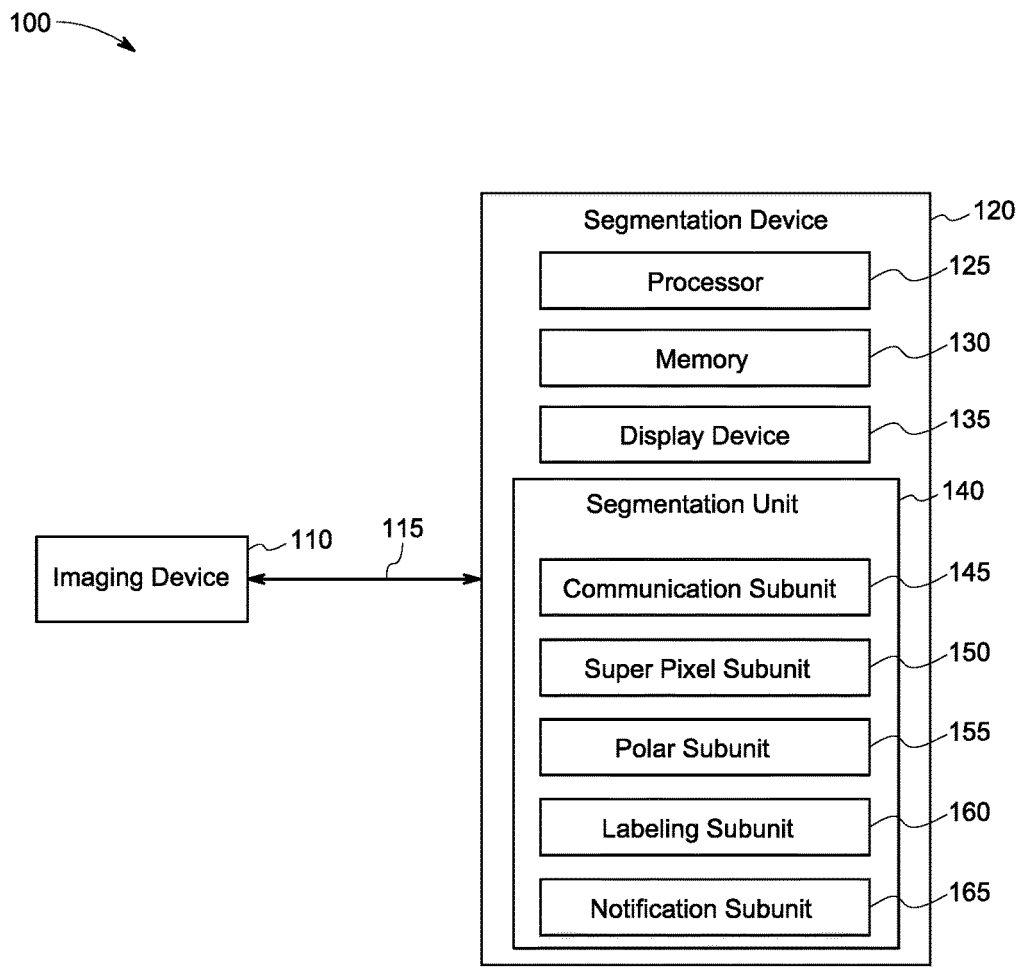

(51) Int. Cl.
*G06K 9/52* (2006.01)
*G06K 9/46* (2006.01)

(56) References Cited

U.S. PATENT DOCUMENTS

| | | | |
|---|---|---|---|
| 2006/0239548 A1 | 10/2006 | George et al. | |
| 2008/0056577 A1* | 3/2008 | Grady | G06K 9/469 382/180 |
| 2011/0116708 A1* | 5/2011 | Zhou | G06K 9/469 382/164 |
| 2011/0194762 A1 | 8/2011 | Haibing | |
| 2014/0233849 A1 | 8/2014 | Weng et al. | |
| 2015/0332127 A1* | 11/2015 | Zheng | G06T 7/0081 382/165 |

OTHER PUBLICATIONS

Kuang-Chih et al., "Markov random field models for hair and face segmentation", Automatic Face & Gesture Recognition, 2008. FG '08. 8th IEEE International Conference on, Sep. 2008, pp. 1-6.

Wang et al., "A novel two-tier Bayesian based method for hair segmentation", Proceeding ICIP'09 Proceedings of the 16th IEEE international conference on Image processing, 2009, pp. 2377-2380.

Ferrara et al., "A multi-classifier approach to face image segmentation for travel documents", Expert Systems with Applications, vol. 39, 2012, pp. 8452-8466.

Kae et al., "Augmenting CRFs with Boltzmann Machine Shape Priors for Image Labeling", Proceeding CVPR '13 Proceedings of the 2013 IEEE Conference on Computer Vision and Pattern Recognition, 2013, pp. 2019-2026.

Wang et al., "Data-driven hair segmentation with isomorphic manifold inference", Image and Vision Computing, vol. 32, 2014, pp. 739-750.

Shen et al., "Image Based Hair Segmentation Algorithm for the Application of Automatic Facial Caricature Synthesis", The Scientific World Journal, vol. 2014,10 Pages.

Felzenszwalb, P.F., and Veksler, O., "Tiered scene labeling with dynamic programming," IEEE Conference on Computer Vision and Pattern Recognition (CVPR), pp. 3097-3104 (Jun. 13-18, 2010).

Huang, G. B., et al., "Towards unconstrained face recognition," IEEE Computer Society Conference on Computer Vision and Pattern Recognition Workshops, pp. 1-8 (Jun. 23-28, 2008).

Extended European Search Report and Opinion issued in connection with corresponding EP Application No. 16203484.7 dated Apr. 24, 2017.

* cited by examiner

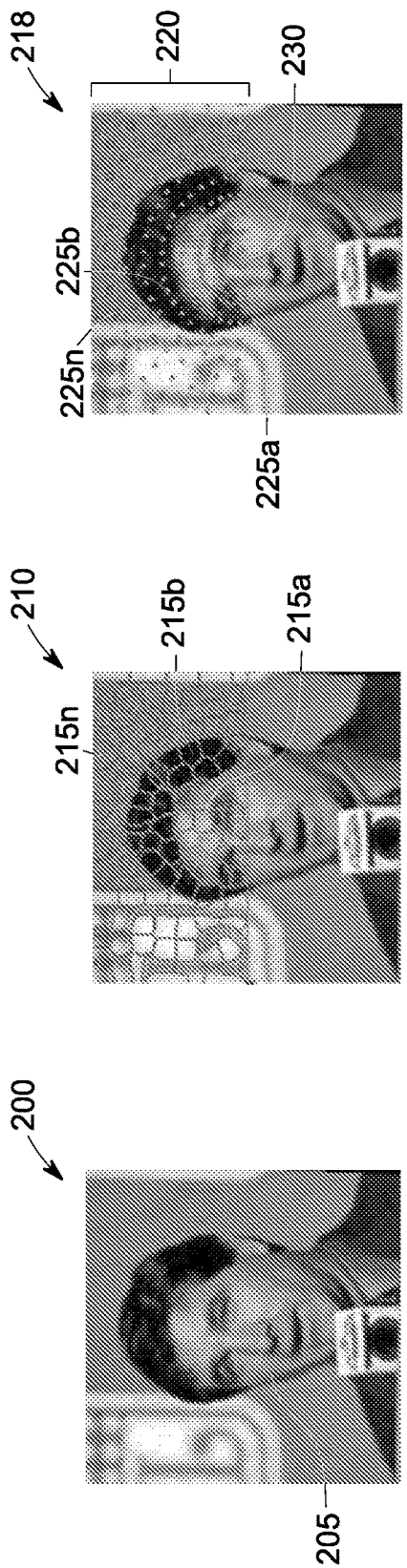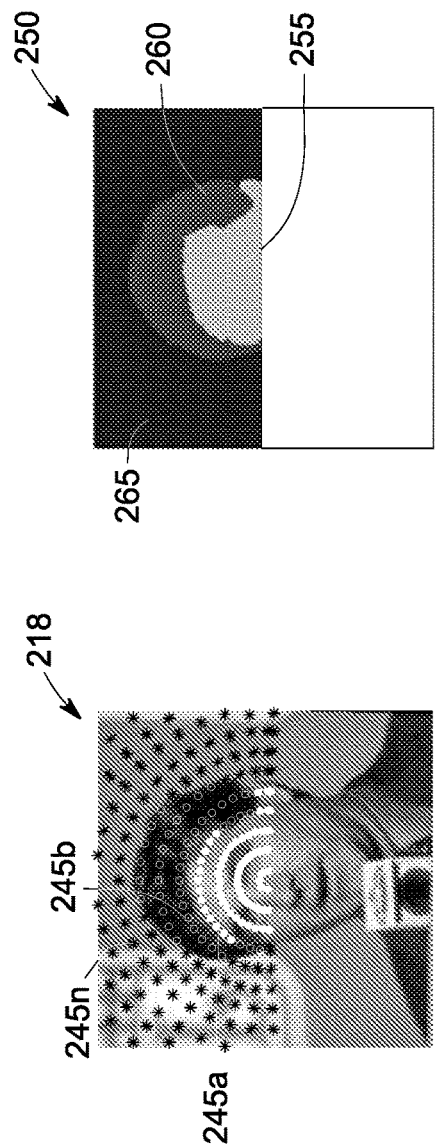

SYSTEMS AND METHODS FOR HAIR SEGMENTATION

BACKGROUND

The technology disclosed herein generally relates to image segmentation. More specifically, the technology disclosed herein relates to systems and methods for hair segmentation based on a tiered structure constraint.

The advent of computer vision and computer graphic technologies has led to the growth of a variety of applications such as face recognition, object/human tracking, gender classification, head detection, hair synthesis, animation, and the like. Since hair is an important feature with respect to human appearance, computer vision scientists often use hair segmentation as a basis for the various applications.

Currently available methods for hair segmentation suffer from numerous problems due to large variations in the appearance (for example, color, texture, shape, and the like) of hair among different kinds of people, variations in lighting, cluttered backgrounds, and the like. Furthermore, currently available methods for hair segmentation are not fast enough for real-time applications.

BRIEF DESCRIPTION

In accordance with one aspect of the present specification, a method includes receiving, with at least one processor, an image comprising a human head from an imaging device. Further, the method includes grouping one or more pixels of the image into one or more super pixels. Furthermore, the method includes generating a polar coordinate grid for the image, wherein the polar coordinate grid comprises one or more grid points. Additionally, the method includes labeling the one or more grid points as corresponding to one of a face region, a hair region, and a background region based on a tiered structure constraint. The method also includes, labeling the one or more super pixels as corresponding to one of the face region, the hair region, and the background region based on the one or more labels of the one or more grid points. Further, the method includes transmitting a notification comprising the one or more labels of the one or more super pixels. A computer program product including a non-transitory computer readable medium, which in turn includes one or more tangible media, where the one or more tangible media include code adapted to perform the method is also presented.

In accordance with another aspect of the present specification, a system is presented. The system includes at least one processor. Further, the system includes a communication subunit configured to receive an image comprising a human head from an imaging device. Further, the system includes a super pixel subunit configured to group one or more pixels of the image into one or more super pixels. Furthermore, the system includes a polar subunit configured to generate a polar coordinate grid for the image, wherein the polar coordinate grid comprises one or more grid points. Additionally, the system includes a labelling subunit configured to label the one or more grid points as corresponding to one of a face region, a hair region, and a background region based on a tiered structure constraint and label the one or more super pixels as corresponding to one of the face region, the hair region, and the background region based on the one or more labels of the one or more grid points. The system also includes a notification subunit configured to transmit a notification comprising the one or more labels of the one or more super pixels.

DRAWINGS

Figure 3:
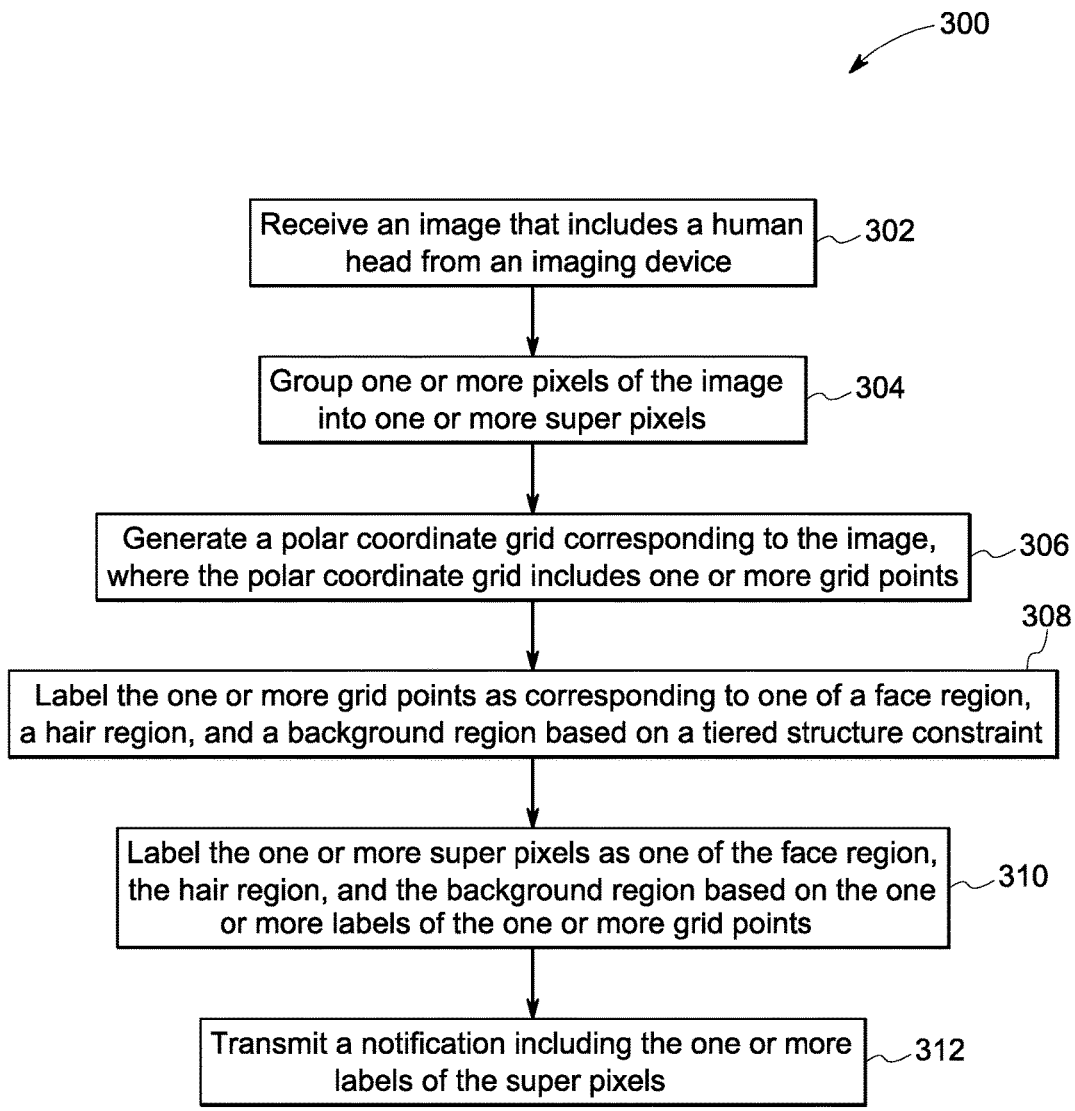
Figure 4:
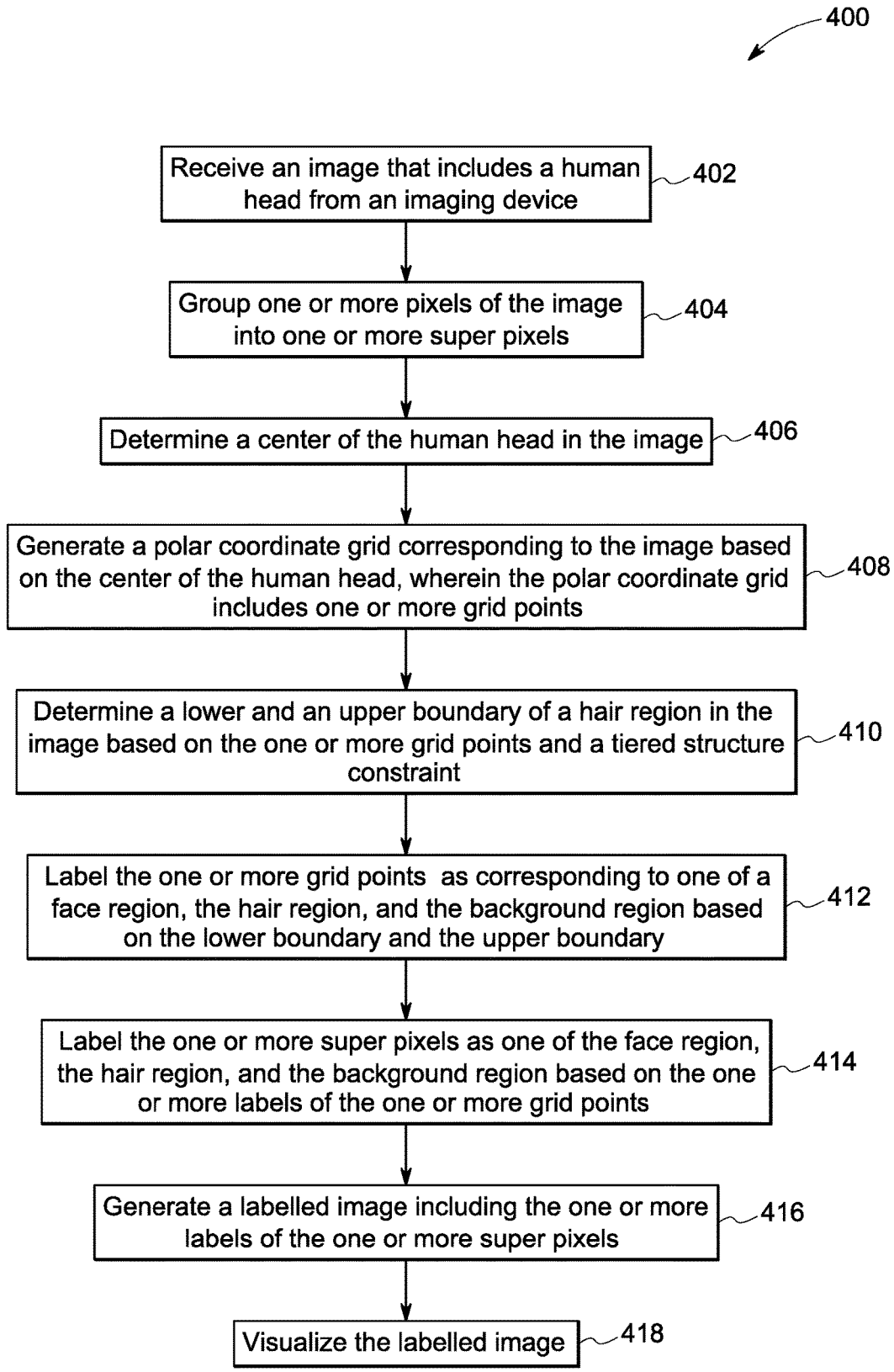

These and other features, aspects, and advantages of the present invention will become better understood when the following detailed description is read with reference to the accompanying drawings in which like characters represent like parts throughout the drawings, wherein:

FIG. 1 is a block diagram illustrating an exemplary system for hair segmentation, in accordance with aspects of the present specification;

FIGS. 2(*a*)-2(*e*) are diagrammatic representations illustrating an exemplary method for hair segmentation, in accordance with aspects of the present specification; and FIGS. 3-4 are flow diagrams illustrating exemplary methods for hair segmentation, in accordance with aspects of the present specification.

DETAILED DESCRIPTION

In the following specification and the claims, reference will be made to a number of terms, which shall be defined to have the following meanings.

The singular forms "a," "an," and "the" include plural references unless the context clearly dictates otherwise.

As used herein, the term "non-transitory computer-readable media" is intended to be representative of any tangible computer-based device implemented in any method or technology for short-term and/or long-term storage of information, such as, computer-readable instructions, data structures, program modules and sub-modules, or other data in any device. Therefore, methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media such as a firmware, physical and virtual storage, a compact disc read only memory, a digital versatile disc, and any other digital source such as a network or the Internet, as well as yet to be developed digital means, with the sole exception being a transitory, propagating signal.

As used herein, the terms "software" and "firmware" are interchangeable, and include any computer program stored in memory for execution by devices that include, without limitation, mobile devices, clusters, personal computers, workstations, clients, and servers.

As used herein, the term "computer" and related terms, e.g., "computing device", are not limited to integrated circuits referred to in the art as a computer, but broadly refers to at least one microcontroller, microcomputer, programmable logic controller (PLC), application specific integrated circuit, and other programmable circuits, and these terms are used interchangeably herein throughout the specification.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Systems and methods for hair segmentation are described herein. FIG. 1 illustrates a block diagram of an exemplary system 100 for hair segmentation, in accordance with aspects of the present specification. In the illustrated embodiment, the system 100 includes an imaging device 110 and a segmentation device 120 that are communicatively coupled to each other. In the embodiment of FIG. 1, the imaging device 110 and the segmentation device 120 are shown as being communicatively coupled via a wired signal line 115. However, in other embodiments, the imaging device 110 and the segmentation device 120 may be communicatively coupled wirelessly. Although the embodiment of FIG. 1 depicts the imaging device 110 and the segmentation device 120 as two standalone units, in another embodiment, the segmentation device 120 may be included within the imaging device 110.

The imaging device 110 may be any type of device that is configured to generate an image and/or a video (i.e., a sequence of images), for example, a camera, a digital video recorder, a camcorder, a closed-circuit television, a webcam, and the like. In one embodiment, the imaging device 110 is configured to generate the image and/or the video that at least includes a human head. The imaging device 110 is further configured to transmit the image and/or the video to the segmentation device 120 via the signal line 115. Although in the illustrated embodiment, the system 100 includes a single imaging device 110, in another embodiment, the system 100 may include a plurality of imaging devices 110.

Furthermore the segmentation device 120 may be any type of device that is configured to receive the image and/or the video and segment at least a hair region of the human head in the image and/or the video. While the focus of the discussion herein is on hair segmentation, it may be noted that the segmentation device 120 may also perform other functions such as, but not limited to, controlling the imaging device 110, object tracking, facial recognition, and the like. In the illustrated embodiment, the segmentation device 120 includes a processor 125, a memory 130, a display device 135, and a segmentation unit 140.

The processor 125 may include at least one arithmetic logic unit, microprocessor, general purpose controller or other processor arrays configured to perform computations, and/or retrieve data stored in the memory 130. In one embodiment, the processor 125 may be a multiple core processor. The processor 125 processes data signals and may include various computing architectures including a complex instruction set computer (CISC) architecture, a reduced instruction set computer (RISC) architecture, or an architecture implementing a combination of instruction sets. In one embodiment, the processing capability of the processor 125 may support the retrieval of data and transmission of data. In another embodiment, the processing capability of the processor 125 may also perform more complex tasks, including various types of feature extraction, modulating, encoding, multiplexing, and the like. Use of other types of processors, operating systems, and physical configurations is also envisioned.

The memory 130 may be a non-transitory storage medium. For example, the memory 130 may be a dynamic random access memory (DRAM) device, a static random access memory (SRAM) device, flash memory or other memory devices. The memory 130 may also include a non-volatile memory or similar permanent storage device, and media such as a hard disk drive, a floppy disk drive, a compact disc read only memory (CD-ROM) device, a digital versatile disc read only memory (DVD-ROM) device, a digital versatile disc random access memory (DVD-RAM) device, a digital versatile disc rewritable (DVD-RW) device, a flash memory device, or other non-volatile storage devices.

The memory 130 stores data that is required for the segmentation unit 140 to perform associated functions. In one embodiment, the memory 130 stores codes and routines associated with one or more subunits (for example, a communication subunit 145, a labeling subunit 160, and the like) of the segmentation unit 140. In another embodiment, the memory 130 stores a tiered structure constraint that is defined by, for example, an administrator of the segmentation device 120. The tiered structure constraint will be described in greater detail with reference to the labeling subunit 160 of the segmentation unit 140.

Moreover, the segmentation unit 140 is configured to segment at least the hair region of the human head in the image and/or the video. In the illustrated embodiment, the segmentation unit 140 includes a communication subunit 145, a super pixel subunit 150, a polar subunit 155, a labeling subunit 160, and a notification subunit 165. The plurality of subunits of the segmentation unit 140 may include code and routines that may be implemented as software, hardware, or a combination of software and hardware. The subunits of the segmentation unit 140, the processor 125, the memory 130, and the display device 135 may be coupled to a bus (not shown) for communication with each other. Although the segmentation unit 140 is described herein according to one embodiment as receiving an image and segmenting at least a hair region in the image, in other embodiments, the segmentation unit 140 may receive a video (i.e., a sequence of images) and segment at least a hair region in the video.

The communication subunit 145 is configured to handle communications between the imaging device 110, the display device 135, and one or more subunits of the segmentation unit 140. In one embodiment, the communication subunit 145 includes a set of instructions executable by the processor 125 to provide the functionality for handling communications between the imaging device 110, the display device 135, and one or more subunits of the segmentation unit 140. In another embodiment, the communication subunit 145 may be stored in the memory 130 and is accessible and executable by the processor 125. In either embodiment, the communication subunit 145 is adapted for communication and cooperation with the processor 125 and one or more subunits of the segmentation unit 140.

In one embodiment, the communication subunit 145 receives an image that includes a human head from the imaging device 110. The communication subunit 145 transmits the image to the super pixel subunit 150 and the polar subunit 155. In another embodiment, the communication subunit 145 receives graphical data for providing a notification to, for example, a user of the segmentation device 120. In such an embodiment, the communication subunit 145 may transmit the graphical data to the display device 135.

The super pixel subunit 150 is configured to group one or more pixels of the image into one or more super pixels. In one embodiment, the super pixel subunit 150 includes a set of instructions executable by the processor 125 to provide the functionality for grouping one or more pixels of the image into one or more super pixels. In another embodiment, the super pixel subunit 150 may be stored in the memory 130 and is accessible and executable by the processor 125. In either embodiment, the super pixel subunit 150 is adapted for communication and cooperation with the processor 125 and the other subunits of the segmentation unit 140.

As noted hereinabove, in one embodiment, the super pixel subunit 150 receives the image from the communication subunit 145. The super pixel subunit 150 groups one or more pixels into one or more super pixels based on one or more image features using image segmentation/clustering algorithms. Some examples of the image segmentation/clustering algorithms include a linear iterative clustering algorithm, a quick shift image segmentation algorithm, a Felzenszwalb segmentation algorithm, and the like. Non-limiting examples of the one or more image features include a color, a texture, a shape, and a location of the one or more pixels. Further, the super pixel subunit 150 may be configured to determine a density of the super pixels based on a number of super pixels and the number of pixels in the image. Furthermore, the super pixel subunit 150 is configured to transmit super pixel data (i.e., data related to the one or more super pixels in the image) to the polar subunit 155 and the labeling subunit 160. The super pixel data includes, for example, image features associated with each super pixel, super pixel density, and the like.

Furthermore, the polar subunit 155 is configured to generate a polar coordinate grid for the image. In one embodiment, the polar subunit 155 includes a set of instructions executable by the processor 125 to provide the functionality for generating a polar coordinate grid for the image. In another embodiment, the polar subunit 155 may be stored in the memory 130 and is accessible and executable by the processor 125. In either embodiment, the polar subunit 155 is adapted for communication and cooperation with the processor 125 and the one or more subunits of the segmentation unit 140.

As previously noted, in one embodiment, the polar subunit 155 receives the image from the communication subunit 145. The polar subunit 155 is configured to generate a polar coordinate grid including one or more grid points corresponding to the image. In one embodiment, the polar subunit 155 assigns the center of the image as the origin of the polar coordinate grid. In another embodiment, the polar subunit 155 assigns a center of the human head in the image as the origin of the polar coordinate grid. In such an embodiment, the polar subunit 155 identifies the center of the human head based on the locations of one or more facial features (for example, a nose, eyes, a mouth, and the like). The polar subunit 155 may detect these facial features using, for example, a neural network based face detection algorithm, a shape based detection algorithm, and the like.

In another embodiment, the polar subunit 155 generates the polar coordinate grid based on the super pixel density. For example, the polar subunit 155 assigns the super pixel density as the density of the grid points of the polar coordinate grid. In another example, the polar subunit 155 assigns a higher density (i.e., higher than the super pixel density) to grid points near the center of the image and a sparser density (i.e., lesser than the super pixel density) to grid points near the boundaries of the image. In such an example, the polar subunit 155 may assign the number of super pixels as the number of grid points in the polar coordinate grid. The polar subunit 155 is further configured to transmit the polar coordinate grid to the labeling subunit 160.

The labeling subunit 160 is configured to label the one or more grid points and the one or more super pixels. In one embodiment, the labeling subunit 160 includes a set of instructions executable by the processor 125 to provide the functionality for labeling the one or more grid points and the one or more super pixels. In another embodiment, the labeling subunit 160 may be stored in the memory 130 and is accessible and executable by the processor 125. In either embodiment, the labeling subunit 160 is adapted for communication and cooperation with the processor 125 and the one or more subunits of the segmentation unit 140.

Additionally, the labeling subunit 160 receives the super pixel data and the polar coordinate grid from the super pixel subunit 150 and the polar subunit 155 respectively. The labeling subunit 160 is configured to label the grid points in the polar coordinate grid as corresponding to one of a face region, a hair region, and a background region. In one embodiment, the labeling subunit 160 labels the grid points based on a tiered structure constraint and a Conditional Random Field (CRF).

The tiered structure constraint indicates that the hair region lies between the face region and the background region in the image. In one example, where the origin of the polar coordinate grid is defined as the center of the human head, the tiered structure constraint indicates that a ray connecting the origin of the polar coordinate grid and a subset of the one or more grid points along a radial direction, will begin from the face region, pass through the hair region, and end in the background region of the image. Accordingly, the tiered structure constraint indicates that labels for the subset of one or more grid points connected by the ray will be in an order that begins from the face region, changes from the face region to the hair region, and then changes from the hair region to the background region. In one example, if the human head in the image has no hair region (i.e., bald), the tiered structure constraint indicates that the labels for the subset of the one or more grid points on the ray will be in an order that changes from the face region to the background region.

Moreover, the CRF is a statistical model (for example, a discriminative undirected graphical model) that models local relationships between one or more portions of the image. In such an embodiment, the labeling subunit 160 generates a two-dimensional (2D) graph (i.e., the CRF) by defining the grid points of the polar coordinate grid as one or more nodes of the 2D graph that are connected by one or more edges. A node may be connected to other adjacent nodes in the 2D graph in both radial and circumferential directions. For the purpose of clarity and convenience, the one or more grid points of the polar coordinate grid will be referred to as the one or more nodes in the description related to the 2D graph.

Further, the labeling subunit 160 assigns one or more node features for each node and one or more edge features for each edge based on the one or more image features. In one example, the labeling subunit 160 maps the 2D graph with a super pixelated version of the image. In such an example, the labeling subunit 160 identifies a super pixel that matches the location of a node and assigns the image features associated with the matching super pixel as the node features for the node. Once the labeling subunit 160 assigns one or more node features for each node, the labeling subunit 160 further assigns one or more edge features for each edge based on a relationship between the one or more node features of the two nodes connected by the corresponding edge.

In such an embodiment, the labeling subunit 160 estimates the probability of each label (i.e., the face region, the hair region, and the background region) for each node (i.e., grid point) based on the one or more node features, the one or more edge features, and the tiered structure constraint. Further, the labeling subunit 160 contemporaneously labels each node based on the probabilities of the labels for each node by minimizing an energy function of the CRF. The energy function is defined by the equations (1)-(4).

$$P_{crf}(Y|X) \propto \exp(-Ecrf(Y,X)) \qquad (1)$$

$$E_{crf}(Y,X) = E_{node}(Y,X_{node}) + E_{edge}(Y,X_{edge}) \qquad (2)$$

$$X \in \{X_{node}, X_{edge}\} \qquad (3)$$

$$Y \in \{\text{faceregion, hairregion, backgroundregion}\} \qquad (4)$$

wherein equations (1)-(4), Y represents a label, $X_{node}$ represents the one or more node features, $X_{edge}$ represents the one or more edge features, $E_{crf}$ represents the energy function of the CRF, $P_{crf}$ represents the probabilities of each label for a node, $E_{node}$ represents a unary energy term for a node, and $E_{edge}$ represents a pairwise energy term for an edge connecting two adjacent nodes in both radial and circumferential directions. The labeling subunit 160 estimates the unary energy terms based on the probabilities of the labels for each node using, for example, a multiple logistic regression model, a weighted regression model, and the like.

In a further embodiment, the labeling subunit 160 labels the one or more grid points based on the CRF and the tiered structure constraint using a dynamic programming algorithm. The labeling subunit 160 converts the 2D graph to a one-dimensional (1D) graph since the tiered structure constraint indicates that the labels along each column of the 2D graph will change twice (i.e., from a face region to a hair region and from a hair region to a background region). Thus, in such an embodiment, the labeling subunit 160 is configured to determine an upper boundary and a lower boundary of the hair region. The labeling subunit 160 generates a node of the 1D graph based on the nodes of a corresponding column in the 2D graph. Each node of the 1D graph represents the upper boundary and the lower boundary of a corresponding column in the 2D graph. As used herein, the term "lower boundary" refers to the boundary between the face region and the hair region in the 2D graph. Also, as used herein, the term "upper boundary" refers to the boundary between the hair region and the background region in the 2D graph. Further, the labeling subunit 160 generates an edge connecting two nodes of the 1D graph based on the edges connecting the nodes of two adjacent columns in the 2D graph.

Furthermore, the labeling subunit 160 defines the unary and pairwise energy terms for the nodes and edges in the 1D graph based on the energy functions of the 2D graph. The labeling subunit 160 defines the unary energy term for a node in the 1D graph as a sum of the unary energy terms corresponding to all the nodes and pairwise energy terms for all edges connecting two adjacent nodes along the radial direction in a corresponding column of the 2D graph. The unary energy term for a node in the 1D graph is defined by equation (5).

$$E_{col}(p) = \sum_{i \in p} E_{node}(i) + \sum_{i \in p, j \in p} E_{radial}(i, j) \qquad (5)$$

wherein equation (5), $E_{col}(p)$ represents a unary energy term of a node in the $p^{th}$ column of the 1D graph; $E_{node}$ represents the unary energy term of a node in the 2D graph, $E_{radial}$ represents the radial pairwise energy term for an edge, i and j represent adjacent nodes along the radial direction in the $p^{th}$ column of the 2D graph.

In addition, the labeling subunit 160 defines the pairwise energy term for an edge connecting two adjacent nodes in the 1D graph as a summation of all the pairwise energy terms for all edges connecting nodes along the circumferential direction in corresponding columns of the 2D graph. The unary energy term for an edge in the 1D graph is defined by equation (6).

$$E_{edge}(p, q) = \sum_{i \in p, j \in q} E_{circum}(i, j) \qquad (6)$$

wherein equation (6), $E_{edge}(p, q)$ represents a pairwise energy term of an edge connecting a node in the $p^{th}$ column and a node in the $q^{th}$ column of the 1D graph, $E_{circum}$ represents a radial pairwise energy term for an edge, i and j represent nodes along the circumferential direction in the $p^{th}$ and $q^{th}$ column in the 2D graph respectively.

In such an embodiment, the labeling subunit 160 determines the upper and lower boundaries of the hair region in the 2D graph by optimizing the 1D graph using the dynamic programming algorithm. The labeling subunit 160 optimizes the 1D graph by minimizing the energy functions defined by the equations (1), (2), (3), (5), and (6). In one embodiment, the labeling subunit 160 contemporaneously determines the upper boundary and the lower boundary of the hair region using the dynamic programming algorithm. In another embodiment, the labeling subunit 160 sequentially determines the upper boundary and the lower boundary of the hair region using the dynamic programming algorithm. For example, the labeling subunit 160 determines the lower boundary and then determines the upper boundary based on a constraint that the upper boundary will be above the lower boundary in the 2D graph. Similarly, in another example, labeling subunit 160 determines the upper boundary and then determines the lower boundary based on a constraint that the lower boundary will be below the upper boundary in the 2D graph.

Further, the labeling subunit 160 labels each node of the 2D graph as one of the face region, the hair region, and the background region based on the lower and upper boundaries. For example, the labeling subunit 160 labels the nodes between the upper and lower boundaries as the hair region, the nodes between the upper boundary and the borders of the image as the background region, and the nodes between the lower boundary and the origin of the 2D graph (i.e., the origin of the polar coordinate grid) as the face region.

The labeling subunit 160 is further configured to label the one or more super pixels based on the one or more labels of the one or more nodes of the 2D graph (i.e., the one or more labels of the one or more grid points of the polar coordinate grid). In one embodiment, the labeling subunit 160 maps the polar coordinate grid with the super pixelated version of the image. The labeling subunit 160 determines a grid point that matches a location of each super pixel in the super pixelated version of the image. The labeling subunit 160 then labels each super pixel with the label of the matching grid point. In one example, the labeling subunit 160 may determine that a location of a super pixel may match with locations of a plurality grid points. In such an example, the labeling subunit 160 labels the super pixel with the label having the most number of matching grid points amongst the plurality of matching grid points. Further, the labeling subunit 160 is configured to transmit the one or more labels of the one or more super pixels to the notification subunit 165.

The notification subunit 165 is configured to generate a notification based on the one or more labels of the one or more super pixels. In one embodiment, the notification subunit 165 includes a set of instructions executable by the processor 125 to provide the functionality for generating the notification based on the one or more labels of the one or more super pixels. In another embodiment, the notification subunit 165 may be stored in the memory 130 and is accessible and executable by the processor 125. In either embodiment, the notification subunit 165 is adapted for communication and cooperation with the processor 125 and the one or more subunits of the segmentation unit 140.

Further, the notification subunit 165 is configured to receive the one or more labels of the one or more super pixels from the labeling subunit 160 and generate the notification. The notification subunit 165 may then transmit the notification to, for example, a user of the segmentation device 120, a face recognition device (not shown) or an object tracking device (not shown) coupled to the segmentation device 120, and the like. In one embodiment, the notification includes a location of the one or more super pixels representing the hair region. In another embodiment, the notification includes a location of the one or more super pixels representing the face region, the hair region, and the background region. In yet another embodiment, the notification subunit 165 generates a labelled image including the one or more labels of the one or more super pixels as the notification. The labelled image may be a trinary image, where each intensity value of the labelled image uniquely corresponds to one of the three labels. In such an embodiment, the notification subunit 165 may be further configured to generate graphical data for providing the labelled image to, for example, the user of the segmentation device 120. In one example, the notification subunit 165 transmits the graphical data to the display device 135. The display device 135 is configured to render the graphical data and display the labelled image. In another example, the notification subunit 165 transmits the graphical data for providing the labelled image to the user via an electronic mail, a short messaging service, and the like.

FIGS. 2(a)-2(e) respectively depict diagrammatic representations of an exemplary method for hair segmentation in accordance with aspects of the present specification. It may be noted that FIGS. 2(a)-2(e) are described with reference to the components of FIG. 1. FIG. 2(a) illustrates an image 200 that includes a human head 205. Additionally, the image 200 is received by the segmentation unit 140 in the segmentation device 120 from the imaging device 110. In the example of FIGS. 2(a)-2(e), the segmentation device 120 is configured to segment the hair region in the image 200.

Referring now to FIG. 2(b), an exemplary super pixelated version 210 of the image 200 is depicted. This super pixelated version 210 is generated by the super pixel subunit 150 by grouping one or more pixels of the image 200 into one or more super pixels 215a, 215b, ..., 215n. In one example, the super pixel subunit 150 generates the super pixelated version 210 of the image 200 based on the color and texture of one or more pixels of the image 200.

Also, FIG. 2(c) illustrates an image 218 having an exemplary polar coordinate grid 220. The polar coordinate grid 220 is generated by the polar subunit 155. In the illustrated embodiment, the polar subunit 155 generates the polar coordinate grid 220 based on a center 230 of the human head 205 in the image 200. The polar subunit 155 assigns the center 230 of the human head 205 as the origin 230 of the polar coordinate grid 220. Reference numerals 225a, 225b, ..., 225n are generally representative of grid points in the polar coordinate grid 220.

Turning now to FIG. 2(d), an image 240 having exemplary grid point labels 245a, 245b, ..., 245n. These grid point labels 245a, 245b, ..., 245n are generated by the labeling subunit 160. The labeling subunit 160 labels the one or more grid points 225a, 225b, ..., 225n of the polar coordinate grid 220 as corresponding to one of a face region, a hair region, and a background region. In the illustrated embodiment, the labeling subunit 160 labels the one or more grid points 225a, 225b, ..., 225n based on the tiered structure constraint and the CRF, using image features associated with the one or more super pixels 215a, 215b, ..., 215n. The tiered structure constraint indicates that the labels along a ray connecting the origin 230 and the grid points 225a, 225b, ..., 225n in the radial direction will be in an order that begins from the face region, transition to the hair region, and followed by another transition to the background region. In one example, the labeling subunit 160 labels the grid points 225a, 225b, and 225n as respectively corresponding to the face region, the hair region, and the background region. Accordingly, reference numeral 245a is representative of a label associated with the face region, while a label associated with the hair region is generally represented by reference numeral 245b. Similarly, reference numeral 245n is representative of a label corresponding to the background region.

In addition, FIG. 2(e) illustrates an exemplary labelled image 250 generated by the notification subunit 165. In the illustrated embodiment, the labeling subunit 160 labels the super pixels 215a, 215b, ..., 215n based on the labels 245a, 245b, ..., 245n of the one or more grid points 225a, 225b, ..., 225n by mapping the polar coordinate grid 220 onto the super pixelated version 210. The notification subunit 165 then generates the labelled image 250 based on the one or more labels of the one or more super pixels 215a, 215b, ..., 215n. In the labelled image 250, reference numeral 255 is representative of the face region, while the hair region is represented by reference numeral 260. Also, reference numeral 265 represents the background region. It may be noted that in the labelled image 250, the face, hair, and background regions 255, 260, 265 are clearly demarcated. The notification subunit 165 transmits the labelled image 250 to a display for visualization. Moreover, in one example, at least the labelled image 250 may be visualized on the display device 135 of FIG. 1.

Since, hair is typically found in the upper half of the human head, in the illustrated embodiment of FIGS. 2(a)-2(e), the super pixels 215a, 215b, ..., 215n and the polar coordinate grid 220 are generated for a portion above the center 230 of the human head 205 in the received image 200. This is advantageous as it reduces the number of grid points and super pixels and hence, accelerates the labelling process. However, in other embodiments, the segmentation unit 140 may generate the super pixels 215a, 215b, ..., 215n and the polar coordinate grid 220 for the entire image 200.

FIG. 3 is a flow diagram illustrating an exemplary method 300 for hair segmentation, in accordance with aspects of the present specification. The method 300 of FIG. 3 is described with reference to the components of FIG. 1. At step 302, the communication subunit 145 receives an image that includes a human head from the imaging device 110. Further, at step 304, the super pixel subunit 150 groups one or more pixels of the image into one or more super pixels. Also, at step 306, the polar subunit 155 generates a polar coordinate grid for the image, where the polar coordinate grid includes one or more grid points.

Moreover at step 308, the labeling subunit 160 labels the one or more grid points as corresponding to one of a face region, a hair region, and a background region based on a tiered structure constraint. For example, the labeling subunit 160 generates a CRF and labels the one or more grid points based on the tiered structure constraint and the CRF. Additionally at step 310, the labeling subunit 160 labels the one or more super pixels as corresponding to one of the face region, the hair region, and the background region, based on the one or more labels of the one or more grid points. Subsequently at step 312, the notification subunit 165 transmits a notification including the one or more labels of the one or more super pixels to, for example, a user of the segmentation device 120. The notification may include a labelled image such as the labelled image 250 of FIG. 2(e) that clearly demarcates the face, hair, and background regions. The notification subunit 165 generates the labelled image based on the one or more labels of the one or more super pixels. In certain embodiments, the labelled image may be visualized on a display. In another example, the notification subunit 165 may transmit the notification including the one or more labels of the one or more super pixels to a face recognition device or an object tracking device coupled to the segmentation device 120.

FIG. 4 is a flow diagram illustrating another exemplary method 400 for hair segmentation, in accordance with aspects of the present specification. The method 400 of FIG. 4 is described with reference to the components of FIG. 1. At step 402, the communication subunit 145 receives an image that includes a human head from the imaging device 110. Also, at step 404, the super pixel subunit 150 groups one or more pixels of the image into one or more super pixels. Furthermore, at step 406, the polar subunit 155 determines a center of the human head in the image. Additionally, at step 408, the polar subunit 160 generates a polar coordinate grid corresponding to the image based on the center of the human head, where the polar coordinate grid includes one or more grid points.

Moreover at step 410, the labeling subunit 160 determines a lower boundary and an upper boundary of a hair region in the image based on the grid points and a tiered structure constraint. For example, the labeling subunit 160 generates a 2D graph (i.e., the CRF) based on the grid points. The labeling subunit 160 then converts the 2D graph to a 1D graph and determines the lower and upper boundaries of the hair region based on the 1D graph and a dynamic programming algorithm. Further at step 412, the labeling subunit 160 labels the grid points as corresponding to one of a face region, the hair region, and a background region based on the lower boundary and the upper boundary. Furthermore at step 414, the labeling subunit 160 labels the one or more super pixels as corresponding to one of the face region, the hair region, and the background region based on the one or more labels of the one or more grid points. Subsequently at step 416, the notification subunit 160 generates a labelled image, such as the labelled image 250 of FIG. 2(e) including the one or more labels of the one or more super pixels. The labelled image clearly demarcates the face, the hair, and the background regions. Also, in certain embodiments, the labelled image may be visualized on a display, as indicated by step 420.

The systems and methods for hair segmentation described hereinabove present faster and more robust techniques for hair segmentation when compared to the currently available systems and methods. Particularly, use of the tiered structure constraint facilitates effective modeling of the relative locations of a human head in the image and enables a robust optimization of the 2D CRF (i.e., labelling of the one or more grid points). Furthermore, the determination of the lower and upper boundaries based on the tiered structure constraint facilitates the labelling of the one or more grid points in polynomial time. For example, sequentially determining the lower and upper boundaries aids in reducing the time complexity of labelling the one or more grid points to O(mn), where O represents the Big O notification, m represents the number of columns in the 2D or 1D graph, and n represents the number of nodes (i.e., grid points) in each column of the 2D or 1D graph. The reduction of the time complexity is particularly advantageous as it facilitates the usage of the systems and methods for hair segmentation described hereinabove in real-time applications such as, but not limited to, facial recognition, object/human tracking, and the like.

It is to be understood that not necessarily all such objects or advantages described above may be achieved in accordance with any particular implementation. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the technology has been described in detail in connection with only a limited number of implementations, it should be readily understood that the invention is not limited to such disclosed implementations. Rather, the technology can be modified to incorporate any number of variations, alterations, substitutions or equivalent arrangements not heretofore described, but which are commensurate with the spirit and scope of the disclosure. Additionally, while various implementations of the technology have been described, it is to be understood that aspects of the technology may include only some of the described implementations. Accordingly, the inventions are not to be seen as limited by the foregoing description, but are only limited by the scope of the appended claims.

What is claimed as new and desired to be protected by Letters Patent of the United States is:

1. A method, comprising:
   receiving, with at least one processor, an image comprising a human head;
   determining a center of the human head in the image;
   grouping one or more pixels of the image into one or more super pixels;
   generating a polar coordinate grid corresponding to the image, wherein the polar coordinate grid comprises one or more grid points and wherein the polar coordinate grid originates from the center of human head;
   labeling the one or more grid points as corresponding to one of a face region, a hair region, and a background region based on a tiered structure constraint;
   labeling the one or more super pixels as corresponding to one of the face region, the hair region, and the background region based on the one or more labels of the one or more grid points; and
   transmitting a notification comprising the one or more labels of the one or more super pixels.

2. The method of claim 1, wherein the tiered structure constraint indicates that the hair region is located between the face region and the background region in the image.

3. The method of claim 1, further comprising determining a lower boundary and an upper boundary of the hair region based on the one or more grid points and the tiered structure constraint.

4. The method of claim 3, further comprising determining the lower boundary and the upper boundary of the hair region based on a dynamic programming algorithm.

5. The method of claim 3, further comprising determining the lower boundary and the upper boundary of the hair region sequentially or contemporaneously.

6. The method of claim 1, further comprising grouping the one or more pixels of the image into the one or more super pixels based on at least one of a color, a texture, and a shape of the one or more pixels.

7. The method of claim 1, further comprising:
generating a labelled image based on the one or more labels of the one or more super pixels; and
visualizing the labelled image.

8. A segmentation device, comprising:
at least one processor;
a communication subunit configured to receive an image comprising a human head from a camera;
a super pixel subunit communicatively coupled with the communication subunit and configured to group one or more pixels of the image into one or more super pixels;
a polar subunit communicatively coupled with the super pixel subunit and configured to generate a polar coordinate grid corresponding to the image, wherein the polar coordinate grid comprises a plurality of grid points;
a labeling subunit communicatively coupled with the polar subunit and configured to:
label each of the plurality of grid points as corresponding to one of a face region, a hair region, and a background region based on a tiered structure constraint;
label the one or more super pixels as corresponding to one of the face region, the hair region, and the background region based on the one or more labels of the plurality of grid points; and
a notification subunit communicatively coupled with the labeling subunit and configured to transmit a notification comprising the one or more labels of the one or more super pixels, wherein one or more of the communication subunit, the super pixel subunit, the polar subunit, the labeling subunit, and the notification subunit are executable by the at least one processor, wherein the polar subunit is further configured to:
determine a density of the one or more super pixels in the image:
determine a center of the human head in the image; and
generate the polar coordinate and based on the density of the one or more super pixels in the image.

9. The segmentation device of claim 8, wherein the tiered structure constraint indicates that the hair region is located between the face region and the background region in the image.

10. The segmentation device of claim 8, wherein the labeling subunit is further configured to determine a lower boundary and an upper boundary of the hair region based on the plurality of grid points and the tiered structure constraint.

11. The segmentation device of claim 10, wherein the labeling subunit is further configured to determine the lower boundary and the upper boundary of the hair region based on a conditional random field and a dynamic programming algorithm.

12. The segmentation device of claim 10, wherein the labeling subunit is further configured to determine the lower boundary and the upper boundary of the hair region sequentially or contemporaneously.

13. The segmentation device of claim 8, wherein the super pixel subunit is further configured to group the one or more pixels of the image into one or more super pixels based on at least one of a color, a texture, and a shape of the one or more pixels.

14. The segmentation device of claim 8, wherein the tiered structure constraint labels each of the plurality of grid points as the face region, the hair region, or the background region based on an order along a ray connecting a subset of the plurality of grid points.

15. A system, comprising:
an imaging device configured to generate an image comprising a human head, wherein the imaging device comprises a camera;
a segmentation device communicatively coupled to the imaging device and comprising:
at least one processor;
a communication subunit configured to receive the image from the imaging device;
a super pixel subunit communicatively coupled with the communication subunit and configured to group one or more pixels of the image into one or more super pixels;
a polar subunit communicatively coupled with the super pixel subunit and configured to generate a polar coordinate grid corresponding to the image based on a density of the one or more super pixels in the image, wherein the polar coordinate grid comprises one or more grid points;
a labeling subunit communicatively coupled with the polar subunit and configured to:
label the one or more grid points as corresponding to one of a face region, a hair region, and a background region based on a tiered structure constraint;
label the one or more super pixels as corresponding to one of the face region, the hair region, and the background region based on the one or more labels of the one or more grid points; and
a notification subunit communicatively coupled with the labeling subunit and configured to transmit a notification comprising the one or more labels of the one or more super pixels,
wherein one or more of the communication subunit, the super pixel subunit, the polar subunit, the labeling subunit, and the notification subunit are executable by the at least one processor.

16. The system of claim 15, wherein the labeling subunit is further configured to determine a lower boundary and an upper boundary of the hair region based on the one or more grid points and the tiered structure constraint.

17. The system of claim 16, wherein the labeling subunit is further configured to determine the lower boundary and the upper boundary of the hair region sequentially or contemporaneously.

18. The system of claim 15, wherein the notification subunit is further configured to generate a labelled image based on the one or more labels of the one or more super pixels.

19. The system of claim 18, further comprising a display device configured to visualize the labelled image.

* * * * *